May 5, 1964
E. J. KOCHER
3,131,550
LIQUID COOLER WITH AIR AGITATION
Filed May 7, 1962
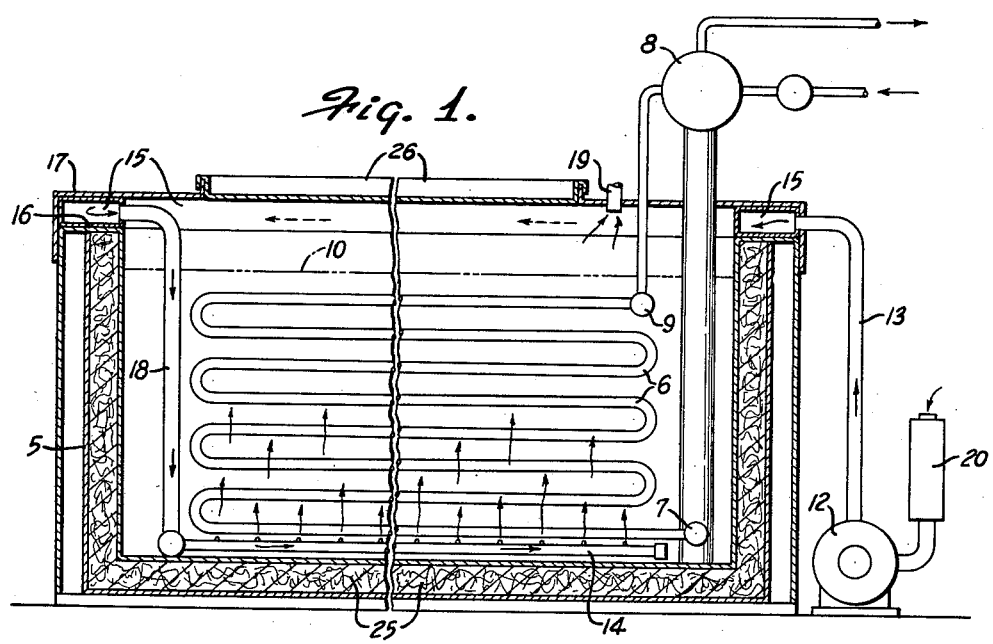
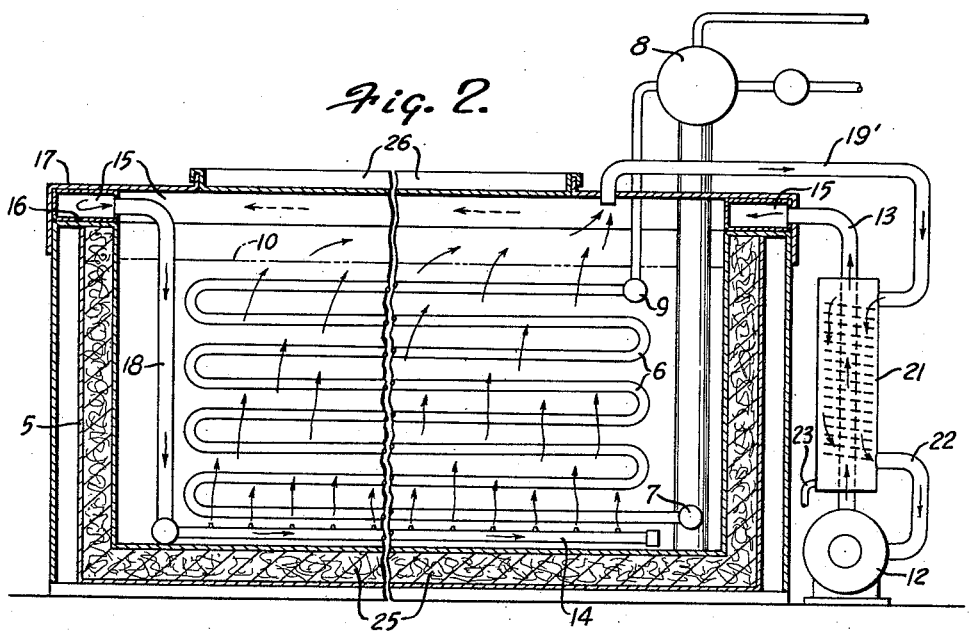
INVENTOR.
E. J. Kocher
BY
Lieber, Lieber & Nilles
Attorneys

United States Patent Office 3,131,550
Patented May 5, 1964

3,131,550
LIQUID COOLER WITH AIR AGITATION
Erich J. Kocher, Milwaukee, Wis., assignor to Vilter Manufacturing Corporation, Milwaukee, Wis., a corporation of Wisconsin
Filed May 7, 1962, Ser. No. 192,739
5 Claims. (Cl. 62—275)

The present invention relates generally to improvements in the art of refrigeration, and relates more particularly to the provision of improved apparatus for cooling liquid circulated within a tank in which air is utilized for agitating the liquid.

A primary object of the invention is to provide an improved liquid cooler and heat transfer apparatus in which novel means are provided for effectively eliminating objectionable condensation in an extremely simple and economical manner.

As disclosed in United States Patents No. 2,077,871, dated April 20, 1937 to W. F. Borgerd et al. and No. 2,854,827, dated October 7, 1958 to T. E. Lockerbie et al., it has been heretofore proposed to provide cooling apparatus which consists generally of a covered tank for receiving liquid and refrigerating apparatus including one or more banks of refrigerant conducting heat transfer coils located within the tank and upon which ice is formed for cooling the liquid, the liquid being agitated in the tank and about the refrigerant coils as by means of air pumped under pressure and released within the tank below the coils to provide uniform ice buildup thereon.

Liquid cooling apparatus of the type thus described has encountered considerable objection from the trade due primarily to the formation of condensation around the sides and ends of the tanks in the proximity of the covers where the temperature is lowered by conductance of heat through the breaker strip or seal while the relatively cool agitating air is escaping from the tank. Particularly on humid days or in humid climates, the exterior temperature of the tank is below the dew point of the surrounding ambient air. Consequently, moisture condenses on the cold surface of the tank and runs down the side and end walls to the floor where it accumulates in stagnant pools. Not only does this collection of moisture constitute a hazard, but the stagnant pools also provide an ideal environment for bacterial growth which is particularly objectionable in dairies, food processing plants and the like where it is extremely important to maintain strict sanitary conditions. In addition, withdrawal of moist air from the top of the tank for recirculation by the blower or air pump in these air agitated cooling devices is harmful to blower operation and frequently causes corrosion and rust.

It is therefore an object of the present invention to provide an improved air agitated liquid cooler which obviates the aforementioned disadvantages attendant prior devices.

Another important object of this invention is to provide an improved liquid cooler and ice builder of the type wherein pressurized air is used for agitating the liquid within the tank which includes novel means for effectively minimizing the formation of condensation on and about the exterior of the tank.

Still another object of the invention is to provide an improved liquid cooler with air agitation wherein the air used for agitating the liquid being cooled is conducted from the blower to the bottom of the tank interior by way of a conduit located between the upper edge of the tank and the cover.

A further object of my present invention is to provide an improved air agitated liquid cooler and ice builder in which the air circulated by means of an air pump or blower to the bottom of the tank and escaping upwardly through the liquid therein is conducted back to the air pump for recirculation with means being interposed in the return air line to the pump suction side for evaporating free moisture and preventing the return thereof to the pump.

An additional object of the present invention is to provide an improved liquid cooler wherein the liquid under treatment is constantly agitated by means of circulating air and in which the air used for agitation is also utilized to temper or moderate the ambient air interiorly and exteriorly of the refrigerating tank as well as the incoming air to the circulating pump or blower.

These and other objects and advantages of the invention will become apparent from the following detailed description considered in conjunction with the accompanying drawing wherein like reference characters designate the same or similar parts in the several views and wherein:

FIG. 1 is a more-or-less schematic vertical section through an air agitated liquid cooler embodying the improved means for minimizing condensate formation; and FIG. 2 is a similar vertical section through one of the improved air agitated coolers somewhat modified to show the circuitry for recirculating air from the tank to the suction side of the air pump via a heat exchanger.

While the present improvements have been shown and described herein as being embodied in a liquid cooler or ice builder of a particular type in which ice is formed on refrigerating coils of so-called serpentine design, it should be understood that the invention may be advantageously applicable to coolers of any type wherein air is used as the agitating means; and it is furthermore contemplated that certain specific descriptive terminology used herein shall be given the broadest possible interpretation consistent with the disclosure.

Referring to the drawing, the liquid cooling device shown therein comprises, in general, a tank 5 housing one or more refrigerating coils 6 connected at one end to an inlet header 7 to which the refrigerant, such as freon, ammonia, or the like, is conducted from an accumulator 8 for circulation through the coils 6, the other end of the coils 6 being connected to a suction header 9 by means of which the refrigerant is removed. Since the refrigerating apparatus is conventional and well known, it requires no detailed explanation and has not been shown herein. In operation, water to be cooled is supplied to the tank 5 in a convenient manner in quantities sufficient to immerse the coils 6 as indicated at 10 by the broken lines, and if desired, the water may be circulated to and from the cooling tank for cooling purposes in adjacent tanks or wherever desired.

As refrigerant is circulated through the coils 6 in the body of water 10, ice is formed on the coils, and it becomes desirable to agitate the water to prevent excessive ice build-up while providing uniformity thereof. This is accomplished by means of pressurized air forced through a conduit 13 by means of a blower or air pump 12, the conduit 13 terminating within the tank and adjacent the bottom thereof below the coils 6 in a plurality of nozzles 14. The air thus emitted from the nozzles 14 rises in the body of water being cooled as indicated by the arrows, and as the air rises within the tank, it serves to agitate the water and maintain the ice build-up on the coils 6 more or less uniform. The cycle of operation can, of course, be controlled in a conventional manner by means of gauges and controls so as to avoid excessive ice build-up.

According to the present invention, the relatively warm air pumped through conduit 13 is conducted through a duct 15 encircling the upper lip of the tank 5 between the lip 16 of the tank and the adjacent portion of the cover 17, the air then flowing from the duct 15 through the conduit 18 to the nozzles 14. The purpose of the duct 15 is to moderate or temper the air interiorly and exteriorly of the tank adjacent the cover so that the exterior temperature in this region is raised above the dew point of the ambient air, thus minimizing or entirely eliminating the possibility of condensate formation.

As shown in FIG. 1, the air forced into the tank by the pump 12 via the conduit 13, duct 15, conduit 18, and nozzles 14 may be permitted to escape to atmosphere through vent 19 with exterior air being drawn into the suction side of the air pump 12 past air filter 20 for circulation. It is, however, desirable to recirculate the air used for agitating purposes, but when moist air is withdrawn from the top of the tank and recirculated in the blower or air pump 12, it contains considerable moisture which is harmful to the air pump and its operating parts. As shown in FIG. 2, this problem is overcome, at least in part, by conducting the spent air from the tank 5 by means of a conduit 19' leading to a heat exchanger 21. The heat exchanger receives its heat transfer medium from the relatively warm air discharged through the conduit 13 of the blower or air pump 12, and the colder air conducted to the heat exchanger 21 via the conduit 19' has the moisture evaporated therefrom as it passes through the heat exchanger and then through conduit 22 to the suction side of the air pump 12. Accumulated moisture in the heat exchanger 21 may, of course, be removed in an obvious manner as by a discharge conduit 23.

The tank 5 may, of course, be formed of metal or any other suitable material and is packed with insulation 25 to minimize heat loss. The cover 17 may likewise be formed of metal or any other suitable material and may be provided with a suitable trap door 26 or the like for ready access to the tank interior. The coils 6 may be formed of copper, steel, or similar material, and the several air conduits and duct may likewise be formed of any conventional materials. If the water cooled within the tank 5 is to be used remotely of the tank, it is, of course, necessary to provide suitable inlet and outlet conduits to and from the tank interior so that the cooling water removed therefrom may be readily replaced.

It has been found that the relatively warm or moderate air conducted from the air pump 12 through the conduit 13 and the duct 15 surrounding the top of the tank effectively tempers or moderates the interior and exterior air to a sufficient extent to eliminate excessive formation of condensate normally occurring as a result of the difference in interior and exterior air temperatures, and the air discharging from the pump 12 through the conduit 13 is likewise effective for use in evaporating the free moisture contained in the air used for agitating purposes and conducted from within the tank back to the pump via the conduit 20, heat exchanger 21, and conduit 22. Removal of this moisture from the recirculating air eliminates the danger of damage to the working parts of the pumps previously occurring because of the moisture content of the recirculating air.

Various modes of carrying out the invention are contemplated as being within the scope of the following claims particularly pointing out and distinctly claiming the subject matter which is regarded as the invention.

I claim:

1. A cooling device comprising, a tank for receiving liquid to be cooled, a top closure for said tank, cooling coils positioned within said tank below the normal liquid level therein, means for circulating a cooling medium through said coils to cool the liquid within said tank, means for supplying gas under pressure from a point exteriorly of said tank to the interior thereof, means for releasing the pressurized gas within said tank below the liquid level therein whereby it percolates upwardly through the liquid body, to agitate the liquid, a duct encircling the upper edge of the tank below said top closure and above the liquid level through which the gas is conducted from the exterior to the interior of said tank, and means for conducting the agitating gas released from the liquid back to the gas supply means for recirculation by way of said duct.

2. A cooling device comprising, a tank for receiving liquid to be cooled, a top closure for said tank, cooling coils positioned within said tank below the normal liquid level therein, means for circulating a cooling medium through said coils to cool the liquid within said tank, means for supplying a gas from a point exteriorly of said tank to the interior thereof, means for releasing the gas within said tank below the liquid level therein whereby it percolates upwardly through the liquid body to agitate the same, means for conducting the agitating gas released from the liquid back to the gas supply means for recirculation, and means for removing entrained liquid from the gas as it is returned to said supply means.

3. A cooling device comprising, a tank for receiving liquid to be cooled, a top closure for said tank, cooling coils positioned within said tank below the normal liquid level therein, means for circulating a cooling medium through said coils to cool the liquid within said tank, means for supplying a gas from a point exteriorly of said tank to the interior thereof, means for releasing the gas within said tank below the liquid level therein whereby it percolates upwardly through the liquid body to agitate the same, conduit means for returning the agitating gas released from the liquid back to the supply means for recirculation, and a heat exchanger interposed in said return conduit for raising the temperature of the returning gas to remove entrained liquid therefrom before it is returned to said supply means.

4. A cooling device comprising, a tank for receiving liquid to be cooled, a top closure for said tank, cooling coils positioned within said tank below the normal liquid level therein, means for circulating a cooling medium through said coils to cool the liquid within said tank, means for supplying gas from a point exteriorly of said tank to the interior thereof, means for releasing the gas within said tank below the liquid level therein whereby it percolates upwardly through the liquid body to agitate the same, conduit means encircling the upper edge of the tank adjacent said top closure and above the liquid level through which the gas is conducted from the exterior to the interior of said tank, means for conducting the agitating gas released from the liquid back to the supply means for recirculation, and means for removing entrained liquid from the gas as it is returned to said supply means for recirculation.

5. A cooling device comprising, a tank for receiving liquid to be cooled, a top closure for said tank, cooling coils positioned within said tank below the normal liquid level therein, means for circulating a cooling medium through said coils to cool the liquid within said tank, an air pump for supplying air under pressure from a point exteriorly of said tank to the interior thereof, means for releasing the pressurized air within said tank below the liquid level therein whereby it percolates upwardly through the liquid body to agitate the same, a duct encircling the upper edge of the tank below said top closure and above the liquid level through which the air is conducted from the exterior to the interior of said tank, conduit means for conducting the agitating air released from the liquid back to the air pump for recirculation, and a heat exchanger interposed in said return conduit for removing entrained liquid from the gas as it is returned to said supply means for recirculation, said heat exchanger utilizing the pressurized air from the high pressure side of said air pump as its heat exchange medium.

References Cited in the file of this patent

UNITED STATES PATENTS

| | | |
|---|---|---|
| 2,575,796 | Conklin | Nov. 20, 1951 |
| 2,674,101 | Calling | Apr. 6, 1954 |
| 2,966,780 | Mills | Jan. 3, 1961 |